United States Patent [19]

Looney et al.

[11] 4,442,014

[45] Apr. 10, 1984

[54] USE OF ESTERS OF SULFONIC ACIDS AS ANTI-SLUDGE AGENTS DURING THE ACIDIZING OF FORMATIONS CONTAINING SLUDGING CRUDE OILS

[75] Inventors: James R. Looney; Lee A. McDougall, both of Houston, Tex.

[73] Assignee: Exxon Research & Engineering Co., Florham Park, N.J.

[21] Appl. No.: 344,606

[22] Filed: Feb. 1, 1982

[51] Int. Cl.$^3$ .......................................... E21B 43/27
[52] U.S. Cl. .............................. 252/8.55 C; 252/353
[58] Field of Search ................ 252/8.55 C, 353, 559; 260/456 P

[56] References Cited

U.S. PATENT DOCUMENTS

| | | | |
|---|---|---|---|
| 2,831,013 | 4/1958 | Mark | 260/456 |
| 2,965,658 | 12/1960 | Kirkpatrick | 260/456 X |
| 3,083,158 | 3/1963 | Markham | 252/8.55 |
| 3,779,916 | 12/1973 | Crowe | 252/8.55 |

*Primary Examiner*—Herbert B. Guynn
*Attorney, Agent, or Firm*—Roland A. Dexter

[57] ABSTRACT

An anti-sludge agent useful for acid stimulated hydrocarbon containing formations is an ester of sulfonic acid, e.g. monoethoxylated dodecyl benzene sulfonic acid, preferably used in combination with from 0.1 to 2 parts by weight of a surfactant.

7 Claims, No Drawings

USE OF ESTERS OF SULFONIC ACIDS AS ANTI-SLUDGE AGENTS DURING THE ACIDIZING OF FORMATIONS CONTAINING SLUDGING CRUDE OILS

BACKGROUND OF THE INVENTION

1. Field of the Invention

The invention relates to the use of esters of sulfonic acids as anti-sludge agents in acid environments and more particularly to the use of the combination of alkoxylated esters of alkyl benzene sulfonic acids with non-ionic dispersants to reduce the formation of sludge arising out of the acid stimulation of oil containing formations.

2. Description of the Prior Art

Mineral and/or organic acids are used to stimulate limestone, dolomote and sandstone hydrocarbon bearing formations. The function of the acid is to dissolve acid soluble materials so as to clean or enlarge the flow channels of the formation leading to the wellbore, allowing more oil and/or gas to flow to the wellbore.

There are problems caused by the interaction of the stimulation acid and certain crude oils in the formation to form sludge. Interaction studies between sludging crude oils and the introduced acid show that permanent rigid solids are formed at the acid oil interface when the aqueous phase is below a pH of about 8. No films are observed for non-sludging crudes with acid.

These sludges are usually reaction products formed between the acid and the high molecular weight hydrocarbons such as asphaltenes, resins, etc.

Once the sludges are formed they are difficult to remove or control. These sludges cause damage to the wellbore generally manifesting itself as a very thick emulsion. It has been suggested that the best solution to the sludge problem is to prevent sludge formation (see Formation, Effect and Prevention of Asphaltene Sludges During Stimulation Treatments by E. W. Moore et al., Journal of Petroleum Technology, Sept. 1965 pp 1023–1028).

Present methods for preventing or controlling sludge formation with the attendant flow problems during the acidization of crude containing formations include adding "anti-sludge" agents to prevent or reduce the rate of formation of crude oil sludge which stabilizes the acid-oil emulsion and include alkyl phenols, fatty acids, and surfactants. Frequently used as the surfactants is a blend of a sulfonic acid derivative and a dispersing surfactant in a solvent. Such a blend generally has dodecyl benzene sulfonic acid (DDBSA) or a salt of it as the major dispersant, i.e. anti-sludge, component. Formulations containing DDBSA have the following problems:

(1) because of the acid's strongly anionic character, it is incompatible with other additives to be used in the blend;
(2) it has poor dispersibility in acids and brines; and,
(3) it is quite corrosive to the metals and humans.

It is therefore, an object to this invention to provide an anti-sludge/demulsifier agent which overcomes the problems resulting from the presence of DDBSA.

SUMMARY OF THE INVENTION

It has been discovered that the reaction of one mole of dodecyl benzene sulfonic acid with one mole of ethylene oxide provides an ester derivative which overcomes the foregoing problems since it is nonionic, compatible in blends useful as anti-sludging agents and of reduced corrosivity.

Therefore, in accordance with the object of this invention, there is provided a method for enhancing the recovery of oil during acid stimulation of hydrocarbon bearing formations containing sluding crude oils comprising the step of adding with the acid used for stimulation at least a sludge inhibiting amount of an ester derivative of a sulfonic acid, said amount generally being from 0.1 to 5, preferably 0.5 to 2, volume percent of the stimulation acid.

Broadly, ester derivatives of a sulfonic acid useful as a major component of an anti-sluding agent is a polyhydroxy alcoholic ester and can be represented by the formula:

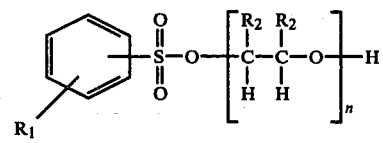

wherein: $R_1$ represents a hydrocarbyl group, preferably an alkyl group, containing from 6 to 22, preferably 12, carbon atoms; $R_2$ represents hydrogen, methyl, ethyl, and phenyl; and n is an integer of from 0.5 to 100, preferably from 0.5 to 10, optimally about 1.

The sulfonic acid esters of polyhydroxy alcoholic compounds are the products of the reaction of a free sulfonic acid with a compound containing an olefin oxide group.

Optimally, the anti-sludge formulation will contain the reaction product of one mole of ethylene oxide and one mole of dodecyl benzene sulfonic acid as the primary active material and a dispersing surfactant.

In accordance with this invention, an anti-sludging agent package comprising from 0.1 to 2 parts by weight of a surfactant per part by weight of an ester derivative of a sulfonic acid and from 0 to 90% by weight solvent.

DETAILED DESCRIPTION OF THE INVENTION

The esters of sulfonic acids constituting the primary active component anti-sludging agent of the invention which has been found to be compatible with other ionic compounds required for use in acidizing formations containing sludging crude oils, dispersible in the acid used for acidization of the formations and relatively noncorrosive can be represented by the formula

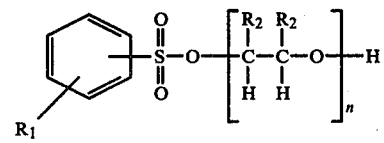

wherein: $R_1$ represents a hydrocarbyl, preferably an alkyl, optimally a 10 to 14 carbon alkyl, group; $R_2$ is hydrogen, alkyl such as methyl, ethyl or propyl, cycloalkyl, and aryl such as phenyl; and n is an integer from 0.5 to 100, preferably 0.5 to 10, optimally 1.

The esters are derived from sulfonic acids which are generally known as well as being commercially available. Thus, the sulphonic acid may be substituted or unsubstituted, aliphatic, cyclic, or alicyclic in character and may be a single compound or a mixture. The sulfonic acids are obtained by the sulfonation of alkyl, alkaryl or aryl hydrocarbons, e.g. sulfonation by means of a solution of $SO_3$ in liquid $SO_2$ at a temperature of less than $-50°$ C. Reference can be made to U.K. Pat. No. 1,204,514 and U.S. Pat. No. 2,778,814 for a fuller understanding the method of producing sulfonates.

The esterification, both in type and amount of olefin oxide compound to react with the sulfonic acid is determined in a manner so as to realize a suitable hydrophilicity, i.e. the anti-sludge activity of the sulfonic acid moiety must be retained while giving the material functional dispersibility in the treating stimulation acid (usually 7 to 28 wt. % HCl) before pumping it into a formation as well as in the acid after it spends on the formation. This esterification of the sulfonic acid also reduces the corrosiveness and the anionic character of the sulfonic acid by making it nonionic. The esterification includes ethoxylation and/or propoxylation by conventional techniques of the olefin oxide compound, e.g. ethylene oxide, propylene oxide and/or mixtures thereof and the alkyl benzene sulfonic acid. The reaction is exothermic with the temperature usefully held at from $105°-150°$ F., e.g. at about $140°$ F.

By a compound containing an olefin oxide group is meant any compound containing the structural grouping

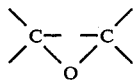

As typical examples of applicable compounds may be mentioned glycerine epi-chlorhydrin, glycide alcohol, ethylene oxide, propylene oxide, butene-2 oxide, butene-1 oxide, isobutylene oxide, butadiene oxide, butadiene dioxide chloroprene oxide, isoprene oxide, styrene oxide, cyclohexylene oxide, cyclopentene oxide, etc. Ethylene oxide and propylene oxide are preferred.

Since olefin oxide compounds are relatively easily hydrated to their corresponding glycol compounds in the presence of water, and since the glycolic compounds do not react readily with the various sulphonic acids, it is desirable that the reaction be executed in the substantial absence of water, i.e., not enough water should be present to convert any appreciable percentage of the olefin oxide used to the glycol.

Although only one olefin oxide group is actually esterified by each sulfonic acid group, the olefin oxide compound usually combines to form a chain connected through ether linkages. By varying the relative quantities of olefin oxide compound and sulphonic acid it is possible to control to a certain extent the production of products with a higher or lower solubility in hydrophillic or lipophillic solvents. In view of the free hydroxyl groups present in the present products and also to some extent to the slight polarity of the ether linkages the present products have, in general, a very desirable range of solubility.

Since the ester of sulfonic acid must be dispersed in the acid stimulation system, a surfactant is to be used in combination with said ester in the anti-sludging/demulsifying agent formulations of this invention. In this combination from 0.1 to 2, preferably 0.2 to 1.2, optimally 0.3 to 1, part by weight of surfactant is present per part by weight of ester.

The surfactant is of the class of dispersing-demulsifying surfactants, dispersing surfactants, demulsifying surfactants and mixtures thereof. The dispersing is concerned with the distribution of the ester into the acid stimulation system whereas the demulsifying is concerned with the breakdown of the water-in-oil emulsions provoked by the acid stimulation system coming into contact with the hydrocarbon containing formation.

The dispersing-demulsifying surfactants are generally alkoxylated polyols, e.g. ethylene glycol, propylene glycol, polypropylene glycol, etc. with varying amounts of ethylene and/or propylene oxide. More specifically polypropylene glycol (1500 mol. wt) is reacted with ethylene oxide at a 3:1 weight ratio.

The dispersing surfactants are generally alkoxylated mono and poly functional alcohols, e.g. hexyl alcohols, octyl alcohols $C_{6-10}$ alcohols, tridecyl alcohols, ethylene glycol, etc. reacted with 1 to 30 moles of ethylene and/or propylene oxide. More specifically as shown in several blends the mixture of $C_{6-10}$ alcohols is reacted with 3 moles of ethylene oxide. Another good example of a dispersing surfactant can be in the range of 5 to 9 moles of ethylene oxide in octyl alcohol.

A demulsifier surfactant is generally an alkoxylated alkyl phenol formaldehyde resin. The resins generally are butyl, amyl, nonyl and/or dinonyl phenol formaldehyde resins with varying amounts of ethylene and/or propylene oxide. Specific examples are nonyl phenol formaldehyde resin with ethylene oxide at a 1 to 0.6 weight ratio and nonyl phenol formaldehyde resin with 50/50 ethylene and propylene oxide at a 1 to 8 weight ratio of resin to mixed oxide.

A hydrocarbon solvent may be used in the formulation to obtain good physical properties of the blend for field use as well as be a good carrier for the other components. The proper solvents will help loosen the sludges. Preferred hydrocarbons solvents are heavy aromatic naphtha, xylene and isopropyl alcohol. The solvent, when used in the formulation, can be present in amounts of up to 90 weight percent, however, a generally useful range is from 20 to 80, preferably 30 to 70, weight percent of the total formulation.

Although the anti-sludge/demulsifying agent formulation has been earlier defined as combinations of ester and surfactant in a solvent, if desired, for the purposes of this disclosure said formulation can also be said to compromise in weight percent based on the total weight of the formulation:

|  | General | Preferred | Optimal |
| --- | --- | --- | --- |
| Ester | 20–90 | 30–70 | 40–60; |
| Surfactant | 9–67 | 17–55 | 23–50 |
| dispersing-demulsifying | 9–67 | 17–55 | 23–50 |
| dispersing | 9–67 | 17–55 | 23–50 |
| demulsifying | 0–34 | 0–27 | 0–25; and, |
| Solvent | 0–90 | 10–70 | 20–50. |

The formulations are readily prepared by mixing the desired quantities of all the components at room temperature.

The anti-sludging package is conventionally admixed with the mineral acid at the well site in an amount ranging from 0.1 to 5, preferably 0.5 to 2, volume percent acid stimulation fluid. The stimulation fluid which is primarily mineral acid usually contains, in addition to the anti-sludge/demulsifying agent formulation, a corrosion inhibitor such as a heterocyclic alkyl pyridine or quinoline benzyl chloride plus an acetylenic alcohol such as octynol plus a non-emulsifying agent such as alkoxylated resins and polyols.

The invention will be further understood by reference to the following Examples which illustrate a preferred form of the invention and compares the same with commercially available formulations.

EXAMPLES 1-15

These examples show that the alkoxylated dodecyl benzene sulfonate esters can control sludge formation in many cases by its sole use. This fact is shown in Table I set forth hereafter wherein said esters are evaluated in the laboratory by mixing a particular sludging crude oil from a particular formation under shear with a simulation acid system as used to stimulate an oil and/or gas well. The ester is added as the antisludge-demulsifier agent to the acid. After the treated acid and crude oil are mixed, the sludge emulsion is poured into a 100 ml graduate to visually determine the amount (% free acid) and speed (time) of the acid separating from the oil.

emulsion. For NEA-A (Exs. 3 and 4), EO-DDBSA gave 94% separation and PO-DDBSA gave 92% separation. Both alkoxylated DDBSAs are better than DDBSA and improve the use of only NEAs. For NEA-B (Exs. 10 and 11), both alkoxylated DDBSAs gave 100% separation of free acid and definitely better than DDBSA.

The alkoxylated DDBSA can control sludge during acidizing in many cases by adding a dispersing surfactant (e.g. ethoxylated alcohols) and solvents. Exs. 5 and 12 show the activity of DDBSA with dispersant and solvent. This modification to DDBSA slightly reduced the separation of free 15% HCl in combination with NEA-A from 93% to 87% (Ex 2 vs. Ex. 5), but improve the separation with NEA-B (Ex. 9 vs. Ex. 12) from 50% in 30 minutes TO 98% in 45 minutes.

The effect of adding of the same amount of dispersant and solvent to EO-DDBSA and PO-DDBSA is shown in Ex. 6, 7 and 13, 14. All four cases show these blends to be better than using the pure alkoxylated DDBSA at the same treat rate of 0.5 vol. %. Increasing the treat rate would improve the separation.

TABLE I

EFFECT OF ALKOXYLATED SULFONIC ACIDS AS ANTI-SLUDGE AGENTS IN COMBINATION WITH NON-EMULSIFYING AGENTS ON SEPARATING HYDROCHLORIC ACID FROM SLUDGING CRUDE OIL EMULSIONS
Test Conditions: 50 ml 15% HCl and 50 ml Meadow Creek Tensleep Crude Oil; Ambient Temperature

| Ex | Anti-Sludge Agent | Vol. % | NEA* | Vol. % | % Free Acid vs Time (Min.) | | | | | Comments |
|----|---|---|---|---|---|---|---|---|---|---|
| | | | | | 2 | 6 | 10 | 15 | 30 | |
| 1 | None | — | A | 1.0 | 72 | 78 | 81 | 81 | 81 | NEA only |
| 2 | DDBSA[1] | 0.5 | A | 1.0 | — | 45 | 88 | 92 | 93 | DDBSA gunks out of acid, anionic. |
| 3 | EO—DDBSA[2] | 0.5 | A | 1.0 | 110 | 100 | 98 | 94 | 94 | EO—DDBSA highly dispersible in acid, nonionic |
| 4 | PO—DDBSA[3] | 0.5 | A | 1.0 | — | 93 | 90 | — | 92 | PO—DDBSA dispersible in acid, nonionic |
| 5 | DDBSA/DISP./IPA[4] | 0.5 | A | 1.0 | — | 79 | 83 | 84 | 87 | More dispersible, anionic |
| 6 | EO—DDBSA/DISP/IPA[5] | 0.5 | A | 1.0 | | | 100/22 | | 100/72 | Two phase break, very highly dispersible, |
| 7 | PO—DDBSA/DISP/IPA[6] | 0.5 | A | 1.0 | 76/10 | 82/20 | — | 83 | 83 | Two phase break, highly dispersible, nonionic |
| 8 | None | — | B | 1.0 | — | 17 | 40 | 82 | 92 | NEA only |
| 9 | DDBSA | 0.5 | B | 1.0 | 0 | 0 | 2 | 10 | 50 | 100% in 1 hour; see above comments on line 2 |
| 10 | EO—DDBSA | 0.5 | B | 1.0 | — | 98 | 100 | | | See above comments |
| 11 | PO—DDBSA | 0.5 | B | 1.0 | — | 4 | 16 | 38 | 100 | See above comments |
| 12 | PDDBA/DISP/IPA | 0.5 | B | 1.0 | — | — | 28 | 44 | — | 98% in 45 minutes; See above comments |
| 13 | EO—DDBSA/DISP/IPA | 0.5 | B | 1.0 | — | 42 | 80 | 93 | 96 | See above comments |
| 14 | PO—DDBSA/DISP/IPA | 0.5 | B | 1.0 | — | 28 | 48 | 80 | 94 | See above comments |
| 15 | None | — | None | — | 0 | 0 | 0 | 0 | 0 | Very viscous emulsion |

*NEA is Non-Emulsifying Agent-commercial products
[1]dodecyl benzene sulfonic acid
[2]ethoxylated DDBSA (1 mole of ethylene oxide)
[3]propoxylated DDBSA (1 mole of propylene oxide)
[4]DDBSA with dispersant surfactant in isopropanol
[5]EO—DDBSA with dispersant surfactant in isopropanol
[6]PO—DDBSA with dispersant surfactant in isopropanol It is seen from Table I that ethoxylated DDBSA and propoxylated DDBSA are each effective as an antisludge agent in 15% HCl and a sludging Meadow Creek Tensleep crude. Two commercial Non-Emulsifying Agents (NEA) were also used in the acid phase during the tests.

Examples 1 and 8 in Table I show the effect of separating free acid from the specific crude versus time for NEAs A and B in the acid.

Examples 2 and 9 show the effect of the present anionic, poorly dispersible DDBSA on separating the NEA treated acid from the crude. The DDBSA improved the percent free acid to 93% in 30 minutes and 100% in 1 hour for NEAs A and B, respectively.

Examples 3, 4 and 10, 11 show the effect of using ethoxylated DDBSA and propoxylated DDBSA alone as anti-sludge agents to separate free acid from crude The alkoxylated DDBSA can control sludge problems in even more crudes by optimizing formulating to include not only the alkoxylated DDBSA, but also varying amounts of demulsifying surfactants, dispersing surfactants in solvents. These formulations will have wider applicability at a better cost, since less of the more expensive alkoxylated DDBSA is required.

EXAMPLES 16-32

This series of examples which are summarized in Table II show the formulation of ethoxylated DDBSA (EO-DDBSA) into effective anti-sludge agents for use in acids with or without commercial non emulsifying agents (NEA-C) using the test procedure of Examples 1-15.

An Acid Sludge Test is prescribed in "API Recommended Practices for Laboratory Testing of Surface Active Agents for Well Stimulation" API RP 42 January, 1977, issued by the American Petroleum Institute, Dallas, Tex. Although this test indicated anti-sludge activity by both the products of the invention and DDBSA, the test failed to provide significant differences in the quantitative data of anti-sludge activities of the said products and DDBSA. This lack of quantitative sensitivity provoked the use of the test procedure described for Examples 1–32.

-continued

| | Wt./% | | Wt. % |
|---|---|---|---|
| Heavy Aromatic Naphtha | 37% | | |

Example 16 shows that 1.5 vol. % of NEA-C only separates 59% of free 15% HCl from the Meadow Creek Teensleep crude emulsion. Exs. 17–19 show that adding 0.5, 1.0 and 1.5 vol. % of Blend 1 in place of NEA-C, the separation increases to 75%, 86% and 98%, respectively.

TABLE II

FORMULATED NONIONIC ANTI-SLUDGE AGENTS USING ETHOXYLATED DDBSA AS MAJOR COMPONENT FOR SEPARATING ACID FROM SLUDGING CRUDE OILS IN COMBINATION WITH OR WITHOUT A NON-EMULSIFYING AGENT

| Ex. | Antisludge Formulation | Vol. % | NEA* | Vol. % | Crude Oil | % Free Acid vs. Time (Min.) 2 | 6 | 10 | 15 | 30 | Comments |
|---|---|---|---|---|---|---|---|---|---|---|---|
| | | | | | Test Conditions: 50 ml 15% HCl and 50 ml Crude Oil; ambient temperature | | | | | | |
| 16 | Blend 1 | 0 | C | 1.5 | Meadow C. Tensleep | 56 | 58 | 58 | 59 | 59 | NEA only, 0.3 Vol. % ACI**-a |
| 17 | Blend 1 | 0.5 | C | 1.0 | Meadow C. Tensleep | 74 | 74 | 74 | 74 | 74 | Combination, 0.3 Vol. % ACI-a |
| 18 | Blend 1 | 1.0 | C | 0.5 | Meadow C. Tensleep | 93 | 86 | 85 | 85 | 86 | Combination with less NEA, 0.3 Vol. % ACI-a |
| 19 | Blend 1 | 1.5 | None | 0 | Meadow C. Tensleep | — | 6 | 24 | 53 | 98 | Antisludge only, 0.3 Vol. % ACI-a |
| 20 | Blend 2 | 1.5 | None | 0 | Meadow C. Tensleep | — | 85 | 90 | 95 | 97 | Antisludge only, 0.3 Vol. % ACI-a |
| 21 | Blend 3 | 1.5 | None | 0 | Meadow C. Tensleep | 73 | 91 | 96 | 97 | 100 | Antisludge only, 0.3 Vol. % ACI-a |
| 22 | Blend 3 | 1.5 | None | 0 | Meadow C. Tensleep | 65 | 86 | 91 | 94 | 98 | Antisludge only, 0.3 Vol. % ACI-b |
| 23 | Blend 3 | 1.5 | None | 0 | Meadow C. Tensleep | 71 | 89 | 95 | — | 99 | Antisludge only, 0.3 Vol. % ACI-c |
| 24 | Blend 3 | 1.5 | None | 0 | Meadow C. Tensleep | 73 | 89 | 94 | 97 | 98 | Antisludge only, No ACI |
| 25 | Blend 4 | 0.2 | C | 0.5 | Baroil Madison | 0 | 0 | 0 | 0 | 0 | Combination, 0.2 Vol. % ACI-a |
| 26 | Blend 4 | 0.5 | C | 0.5 | Baroil Madison | 110 | — | 100 | | | Combination, 0.2 Vol. % ACI-a |
| 27 | Blend 4 | 1.5 | None | 0 | Baroil Madison | 80 | 92 | 95 | 97 | — | Antisludge only, 0.2 Vol. % ACI-a |
| 28 | Blend 5 | 0.5 | None | 0 | Smackover | 0 | 0 | 0 | 0 | 0 | 100% after 1 hour at 150° F., antisludge only, 0.2 Vol. % ACI-b |
| 29 | Blend 5 | 1.0 | None | 0 | Smackover | — | 66 | 80 | 88 | 96 | 100% in 40 minutes with no heat, antisludge only, 0.2 Vol. % ACI-b |
| | | | | | Test Conditions: 50 ml 28% HCl and 50 ml Crude oil; ambient temperature | | | | | | |
| 30 | Blend 5 | 1.0 | None | 0 | Smackover | 8 | 54 | 59 | 62 | 70 | Antisludge only, 0.4 Vol. % ACI-b |
| 31 | Blend 5 | 1.5 | None | 0 | Smackover | — | 76 | 80 | 81 | 87 | Antisludge only, 0.4 Vol. % ACI-b |
| 32 | Blend 6 | 1.5 | None | 0 | Smackover | — | — | 54 | 72 | 93 | Antisludge only, 0.4 Vol. % ACI-b |

*NEA is Non-Emulsifying Agent/commercial product
**ACI is Acid Corrosion Inhibitor - commercial products Six blends of mono ethoxylated dodecyl benzene sulfonic acid designated (EO-DDBSA) and a triethoxylated mixture of $C_6$ to $C_{10}$ alcohols designated ($C_6C_{10}$ OH.(EO)$_3$) were examined in the data of Table II.

The blends were:

| | Wt./% | | Wt. % |
|---|---|---|---|
| Blend 1 | | Blend 5 | |
| EO—DDBSA | 35% | EO—DDBSA | 44% |
| $C_6C_{10}$OH.(EO)$_3$ | 20% | Polyamine salt of polyisobutylene succinic anhydride | 6% |
| Isopropyl Alcohol | 45% | Heavy Aromatic Naphthe | 50% |
| Blend 2 | | Blend 6 | |
| EO—DDBSA | 40% | EO—DDBSA | 50% |
| $C_6C_{10}$OH. (EO)$_3$ | 30% | $C_6C_{10}$OH. (EO)$_3$ | 10% |
| Isopropyl Alcohol | 30% | $C_6$OH. (EO)$_3$+ $C_6$OH. Toluene | 5% 10% |
| Blend 3 | | | |
| EO—DDBSA | 34% | Heavy Aromatic Naphtha | 20% |
| Polyamine salt of polysobutylene succenic anhydride | 6% | | |
| $C_6C_{10}$OH. (EO)$_3$ | 10% | | |
| Heavy Aromatic Naphta | 50% | | |
| Blend 4 | | | |
| EO—DDBSA | 40% | | |
| $C_6C_{10}$OH. (EO)$_3$ | 15% | | |
| (EO).Phenolic resin | 8% | | |

Examples 20 and 21 show the effect of improving separation by further optimization of the formulations.

Examples 21, 24 show that Blend 3 separates the HCl from the crude essentially the same way, regardless of the type of acid corrosion inhibitor (ACI) used in the acid.

Ex. 24, 26 and 27 show (as did Exs. 16–19 above) the effect of anti-sludge blend/NEA-C combinations on separation HCl from another sludging crude—Baroil Madison, Ex. 28 and 29 show the effect of Blend 5 at two treat levels on separating 15% HCl from a third sludging crude, the Smackover.

The last three examples 30–32 of Table II show that the anti-sludge blends can be further optimized to control sludge when the crude contacts higher strength acid, for example 28% HCl. Blend 5 at 1 vol. % separates 70% of the 28% HCl that was emulsified in the Smackover crude and 1.5 vol. % increased the separation to 87%. However, further optimization of the anti-sludge, Blend 6, improved the percent acid separated to 93%.

From these data it is evident that by changing the alkoxylated sulfonic acid component composition and by blending with other surfactants and solvents, a versatile anti-sludge demulsifier agent can be made for use in controlling sludging during the acidizing of formations containing many different types of sludging crude oils.

The invention in its broader aspect is not limited to the specific details shown and described and departures

What is claimed is:

1. A method for enhancing the recovery of sludging crude oils during acid stimulation of hydrocarbon bearing formations comprising the step of adding to the acid used for stimulation at least a sludge inhibiting amount of a nonionic ester derivative of a sulfonic acid represented by the formula

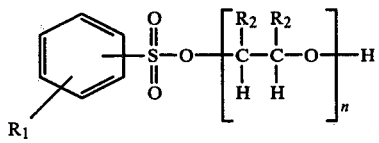

wherein: $R_1$ represents a hydrocarbyl group containing from 6 to 22 carbon atoms; $R_2$ represents hydrogen, methyl, ethyl, and phenyl; and, n is an integer of from 0.5 to 100.

2. A method according to claim 1 wherein said derivative is the mono ethoxylated ester of dodecyl benzene sulfonic acid and is present in said stimulation acid in an amount ranging from 0.1 to 5 volume percent.

3. A method according to claim 2 wherein there is present from 0.1 to 2 parts by weight of surfactant per weight part of said ester, said surfactant being a dispersing- and/or demulsifying surfactant selected from the group consisting of alkoxylated monofunctional alcohols and polyols and alkoxylated alkylphenol-formaldehyde resins.

4. An anti-sludging agent package formulation comprising from 0.1 to 2 parts by weight of a surfactant per part by weight of a nonionic ester derivative of a sulfonic acid represented by the formula

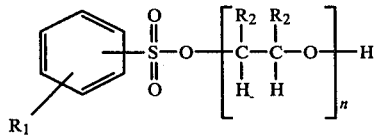

wherein: $R_1$ represents a hydrocarbyl group containing from 0 to 22 carbon atoms; $R_2$ represents hydrogen, methyl ethyl and phenyl; and, n is an integer of from 0.5 3o 100 and from 0 to 90% by weight solvent, said surfactant b?ing a dispersing- and/or demulsifying surfactant selected from the group monofunctional alcohols and polyols and alkoxylated alkyl phenol-formaldehyde resins.

5. A formulation according to claim 3 wherein the weight ratio of surfactant to ester ranges from 0.2 to 1.2 per part by weight of ester.

6. A formulation according to claim 3 wherein the ester is the mono ethoxylated ester of dodecyl benzene sulfonic acid and said weight ratio of surfactant to ester ranges from 0.3 to 1 per part by weight of ester.

7. A formulation according to claim 3 wherein said $R_1$, represents a 10 to 14 carbon alkyl group and n is about 1.

* * * * *

UNITED STATES PATENT OFFICE
CERTIFICATE OF CORRECTION

Patent No. 4,442,014　　　　　　　　Dated April 10, 1984

Inventor(s) James R. Looney et al

It is certified that error appears in the above-identified patent and that said Letters Patent are hereby corrected as shown below:

Column 10, line 18, please delete the number "3o" and substitute therefor ---to---.

Column 10, line 19, please delete the word "b?ing" and substitute therefor ---being---.

Column 10, line 20, after the word "group", please add the following ---consisting of alkoxylated---.

*Signed and Sealed this*

*Second* Day of *October 1984*

[SEAL]

*Attest:*

*Attesting Officer*

GERALD J. MOSSINGHOFF

*Commissioner of Patents and Trademarks*